United States Patent [19]
Ganzel

[11] Patent Number: 6,042,198
[45] Date of Patent: Mar. 28, 2000

[54] VEHICULAR ANTI-LOCK BRAKE SYSTEMS USING FOLLOW VALVES

[75] Inventor: Blaise J. Ganzel, Ann Arbor, Mich.

[73] Assignee: Kelsey-Hayes Company, Livonia, Mich.

[21] Appl. No.: 09/015,165

[22] Filed: Jan. 29, 1998

Related U.S. Application Data

[60] Provisional application No. 60/036,515, Jan. 29, 1997.

[51] Int. Cl.[7] ........................................... B60T 8/34
[52] U.S. Cl. ..................... 303/113.5; 303/84.2; 303/9.72
[58] Field of Search ................................. 303/9.72, 113.5, 303/115.1, 117.1, 155, 187–190, DIG. 10

[56] References Cited

U.S. PATENT DOCUMENTS

| | | | |
|---|---|---|---|
| 4,840,434 | 6/1989 | Leiber | 303/113.5 |
| 4,846,533 | 7/1989 | Farr | 303/113.5 |
| 4,861,114 | 8/1989 | Takata | 303/113.5 |
| 4,893,881 | 1/1990 | Farr | 303/113.5 |
| 5,403,078 | 4/1995 | Farr | 303/117.1 |
| 5,470,137 | 11/1995 | Every et al. . | |
| 5,472,266 | 12/1995 | Volz et al. | 303/116.1 |

*Primary Examiner*—Chris Schwartz
*Attorney, Agent, or Firm*—MacMillan, Sobanski & Todd, LLC; A. Michael Tucker

[57] ABSTRACT

A vehicular anti-lock brake system utilizes a follow valve (also known as a copy valve) in place of a conventional solenoid valve. The follow valve causes brake fluid pressure for a wheel brake to follow and imitate the brake fluid pressure of a wheel brake controlled by a solenoid valve. The follow valve exclusively regulates fluid pressure at a wheel brake so that fluid pressure is substantially similar to fluid pressure at a wheel brake controlled by a solenoid valve.

13 Claims, 3 Drawing Sheets

VEHICULAR ANTI-LOCK BRAKE SYSTEMS USING FOLLOW VALVES

CROSS REFERENCE TO RELATED APPLICATION

This claims the benefit of U.S. provisional patent application identified as Application No. 60/036,515 filed Jan. 29, 1997.

BACKGROUND OF THE INVENTION

This invention relates in general to hydraulic brake systems for vehicles and in particular to vehicular anti-lock brake systems using follow valves.

Anti-lock brake systems for vehicles are well known. A typical system utilizes a hydraulic control unit (HCU) incorporating several solenoid valves for control of brake fluid pressure to the wheel brakes. For example, in a system utilizing an isolation valve and a dump valve for each of four wheels, a total of eight solenoid valves are housed in the HCU. Such a system typically also includes a pump housed in the HCU for pumping fluid from a low pressure accumulator back to a master cylinder and an electric motor for operating the pump.

It is desirable to reduce the cost of an anti-lock brake system by reducing the cost and number of components required by the system and in particular the cost of components housed in the HCU. By replacing conventional solenoid valves with a less costly alternative, the cost of an anti-lock brake system can be reduced.

SUMMARY OF THE INVENTION

This invention includes a vehicular anti-lock brake system utilizing a follow valve (also known as a copy valve) in place of a conventional solenoid valve. The follow valve causes brake fluid pressure for a wheel brake to follow and imitate the brake fluid pressure of a wheel brake controlled by a solenoid valve. The follow valve exclusively regulates fluid pressure at a wheel brake so that fluid pressure is substantially similar to fluid pressure at a wheel brake controlled by a solenoid valve. When a follow valve is used in a pump-to-dump rear anti-lock brake system, the system provides a low cost brake system with dynamic rear proportioning capability.

Two embodiments of anti-lock brake systems using follow valves are disclosed. The first embodiment is designed for a rear wheel anti-lock brake system. The second embodiment is designed for a four-wheel anti-lock brake system. A follow valve having a pair of slidable pistons is disclosed for use in the both of the disclosed systems.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
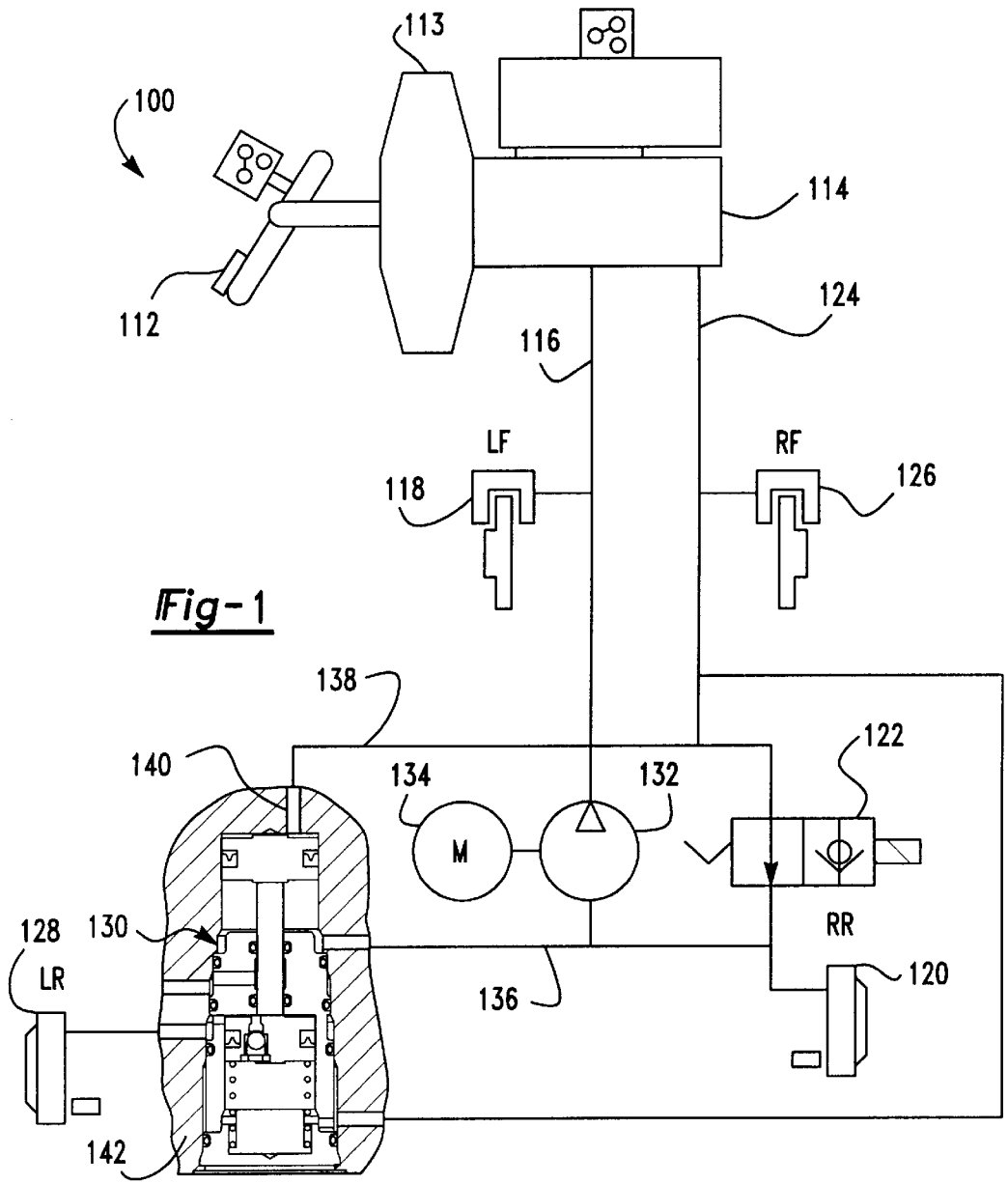
FIG. 1 is a schematic representation of a first embodiment of a vehicular anti-lock brake system in accordance with this invention utilizing a follow valve in a rear wheel anti-lock brake system.

A first embodiment of a vehicular anti-lock brake system according to this invention is schematically illustrated in FIG. 1 and indicated generally at 100. The brake system 100 is a rear wheel anti-lock brake system and includes a brake pedal 112 coupled to a master cylinder 114, preferably a two port master cylinder. Preferably, a vacuum booster 113 is positioned between the brake pedal 112 and the master cylinder 114 in a well-known manner. When the vehicle operator depresses the brake pedal 112, the master cylinder 114 supplies hydraulic brake fluid under pressure through hydraulic lines or conduits to each wheel brake to slow and/or stop associated wheels.

The master cylinder 114 supplies brake fluid to a first supply line 116 which routes fluid to a first or left front wheel brake 118 and a second or right rear wheel brake 120. A normally open isolation valve 122 is arranged in the supply line 116 between the master cylinder 114 and the wheel brake 120. The isolation valve 122 is preferably formed as a two position, normally open solenoid valve.

The master cylinder 114 also supplies brake fluid to a second supply line 124 which routes fluid to a second or right front wheel brake 126 and a first or left rear wheel brake 128. A follow valve 130 is arranged in the supply line 124 between the master cylinder 114 and the wheel brake 128.

A hydraulic pump 132 driven by an electric motor 134 is connected at its inlet to a return line 136. The return line 136 is also connected to an outlet of the follow valve 130 and to the supply line 116 between isolation valve 122 and the right rear wheel brake 120. An outlet of the pump 132 is connected to the supply line 116. Preferably, the outlet of the pump 132 is connected to the supply line 116 between the isolation valve 122 and the master cylinder 114. A branch line 138 is connected between the supply line 116 and a port 140 of the follow valve 130. Preferably, the branch line 138 is connected to the supply line 116 between the isolation valve 122 and the master cylinder 114.

Figure 2:
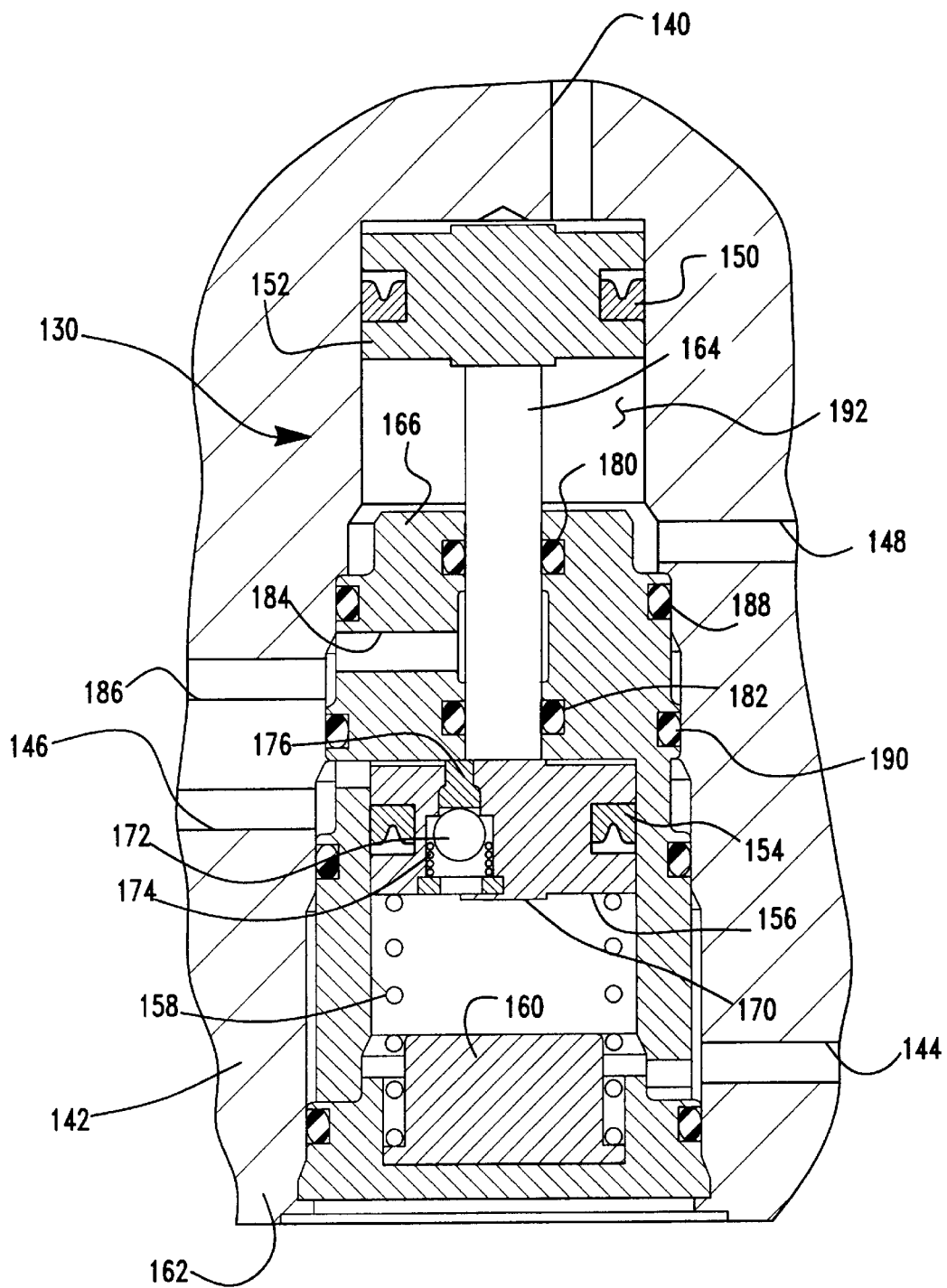
FIG. 2 is an enlarged sectional view of the follow valve in accordance with this invention used in the system of FIG. 1.

An enlarged sectional view of the follow valve 130 is illustrated in FIG. 2. The follow valve 130 is preferably mounted in a stepped bore in a hydraulic control unit (HCU) 142. The HCU 142 is formed as a housing and includes bores for receiving the isolation valve 122 and the pump 132. Internal passageways are provided to permit fluid communication between the components as illustrated in FIG. 1.

Pressurized brake fluid from supply line 124 is received at an inlet port 144 of the follow valve 130 and routed to the wheel brake 128 through outlet port 146. A dump (or outlet) port 148 of the follow valve 130 is connected to the return line 136 and the primary circuit of the system 100. A lipseal 150 provides a low friction seal about a slidable piston 152. A lipseal 154 provides a low friction seal about a slidable piston 156. A spring 158 biases piston 156 away from a spring seat 160 and an end cap 162. A pin 164 is slidably received through a bore in the upper section of a valve sleeve 166 and is in contact at its ends with pistons 152 and 156. Pressurized fluid at port 140 from the branch line 138 urges piston 152, pin 164 and piston 156 downwardly against spring 158. When pressurized fluid forces piston 156 toward seat 160, fluid from port 144 is prevented from reaching outlet port 146. A step 170 formed on the lower surface of the piston 156 provides a flow path to port 144 and prevents a hydraulic lock between piston 156 and seat 160. Similar steps are preferably formed on the upper surface of piston 156 and the upper and lower surfaces of piston 152.

A ball 172 is received in a stepped bore in piston 156 and biased by a spring 174 against a valve stem 176. The valve stem 176 is slidably received in the stepped bore in piston 156. When piston 156 is urged toward seat 160 by pin 164, ball 172 seats in the bore and blocks fluid flow to port 146. Brake fluid pressure at wheel brake 128 is reduced as piston 152, pin 164 and piston 156 travel downwardly due to pressure from a primary circuit received at port 140.

As the pin 164 reciprocates in response to pressure differences between the primary and secondary circuits, any brake fluid that may seep past seals 180 and 182 is routed through a port 184 formed in the upper section of the valve sleeve 166. Port 184 is disposed in fluid communication with a vent port 186 formed in the HCU 142 in fluid communication with atmospheric pressure. Furthermore, any brake fluid that may seep past seals 188 and 190 is routed to vent port 186.

Follow valve 130 causes the brake fluid pressure at wheel brake 128 to follow the brake fluid pressure at wheel brake 120. In other words, follow valve 130 regulates fluid pressure at wheel brake 128 in response to fluid pressure at wheel brake 120 so that fluid pressure at wheel brake 128 is substantially similar to fluid pressure at wheel brake 120. Follow valve 130 exclusively controls fluid pressure at wheel brake 128 without the need for a solenoid or any other valve.

The system 100 of FIG. 1 provides a low cost, pump to dump anti-lock brake system utilizing only one solenoid valve 122. During anti-lock modes of the system 100, isolation valve 122 is switched to a closed position. Brake fluid pressure at wheel brake 120 is decreased as pump 132 is actuated. Additionally, brake fluid pressure in a chamber 192 between piston 152 and 156 is decreased via dump port 148 and return line 136. Brake fluid pressure at port 140 pushes pistons 152 and 156 downwardly so that brake fluid pressure at inlet port 144 is blocked from the wheel brake 128 as the ball 172 seats.

Figure 3:
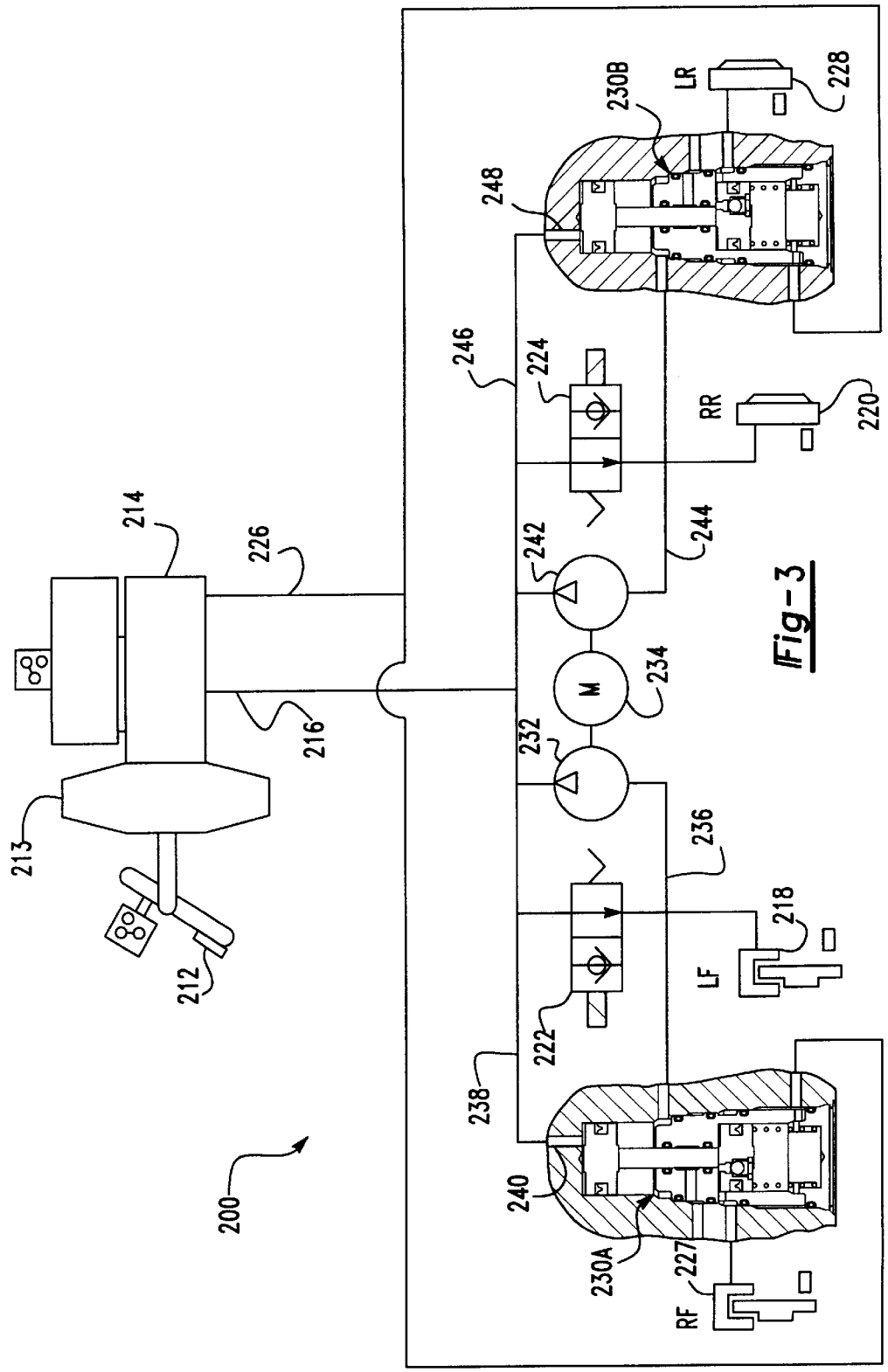
FIG. 3 is a schematic representation of a second embodiment of a vehicular anti-lock brake system in accordance with this invention utilizing two follow valves in a four wheel anti-lock brake system.

A second embodiment of a vehicular anti-lock brake system according to this invention is schematically illustrated in FIG. 3 and indicated generally at 200. The brake system 200 is a four wheel anti-lock system and includes a brake pedal 212 connected to a master cylinder 214, preferably a two port master cylinder. Preferably, a vacuum booster 213 is positioned between the brake pedal 212 and the master cylinder 214 in a well known manner. When the vehicle operator depresses the brake pedal 212, the master cylinder 214 supplies hydraulic brake fluid under pressure through hydraulic lines or conduits to each wheel brake to slow and/or stop associated wheels.

The master cylinder 214 supplies brake fluid to a first supply line 216 which routes fluid to a left front wheel brake 218 and a right rear wheel brake 220. A first normally open isolation valve 222 is arranged in the supply line 216 between the master cylinder 214 and the wheel brake 218. A second normally open isolation valve 224 is arranged in the supply line 216 between the master cylinder 214 and the wheel brake 220. Each of the isolation valves 222 and 224 is preferably formed as a two position solenoid valve.

The master cylinder 214 also supplies brake fluid to a second supply line 226 which routes fluid to a right front wheel brake 227 and a left rear wheel brake 228. A first follow valve 230A is arranged in the supply line 226 between the master cylinder 214 and the wheel brake 227. A second follow valve 230B is arranged in the supply line 226 between the master cylinder 214 and the wheel brake 228. The follow valves 230A and 230B can be identical to follow valve 130 disclosed in FIGS. 1 and 2.

A first hydraulic pump 232 driven by an electric motor 234 is connected at its inlet to a return line 236. The return line 236 is also connected to an outlet port of the follow valve 230A and to the supply line 216 between isolation valve 222 and the right rear wheel brake 218. An outlet of the pump 232 is connected to the supply line 216. A branch line 238 is connected between port 240 of the follow valve 230A and the supply line 216.

A second hydraulic pump 242 driven by the electric motor 234 is connected at its inlet to a return line 244. The return line 244 is also connected to an outlet port of the follow valve 230B and to the supply line 216 between isolation valve 224 and the right rear wheel brake 220. An outlet of the pump 242 is connected to the supply line 216. A branch line 246 is connected between port 248 of the follow valve 230B and the supply line 216.

Fluid pressure at wheel brake 227 is exclusively controlled by follow valve 230A. Follow valve 230A exclusively controls fluid pressure at wheel brake 227 so that such fluid pressure is substantially similar to fluid pressure at wheel brake 218. Fluid pressure at wheel brake 228 is exclusively controlled by follow valve 230B. Follow valve 230B exclusively controls fluid pressure at wheel brake 228 so that such fluid pressure is substantially similar to fluid pressure at wheel brake 220.

The system 200 of FIG. 3 provides a low cost, pump to dump anti-lock brake system utilizing only two solenoid valves 222 and 224, as well as two follow valves 230A and 230B, two pumps 232 and 242, and one motor 234.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicular anti-luck brake system comprising:
   a master cylinder;
   a first wheel brake;
   a second wheel brake;
   a first supply line connected between the master cylinder and the first wheel brake;
   a second supply line connected between the master cylinder and the second wheel brake;
   an isolation valve provided in the first supply line between the master cylinder and the first wheel brake to control fluid pressure at the first wheel brake; and
   a follow valve provided in the second supply line between the master cylinder and the second wheel brake to exclusively control fluid pressure without the use of another valve at the second wheel brake in response to fluid pressure at the first wheel brake so that fluid pressure in the second wheel brake is substantially similar to fluid pressure in the first wheel brake; and
   a pump having an inlet in fluid communication with the isolation valve and the follow valve for exclusively reducing fluid pressure at the first and second wheel brakes without the use of a valve other than the isolation valve and the follow valve.

2. The brake system defined in claim 1 including a branch line connected between the first supply line and the follow valve.

3. The brake system defined in claim 1 including a return line connected between the follow valve and the first supply line.

4. The brake system defined in claim 3 wherein the return line is connected to the first supply line between the isolation valve and the first wheel brake.

5. The brake system defined in claim 3 wherein the pump inlet is connected to the return line and the pump includes an outlet connected to the first supply line between the isolation valve and the master cylinder.

6. The brake system defined in claim 1 wherein the follow valve includes a pair of slidable pistons.

7. The brake system defined in claim 6 including a slidable pin engaging each of the slidable pistons.

8. The brake system defined in claim 1 wherein the follow valve includes:
   a first piston slidably received in a valve sleeve;
   a second piston slidably received outside of the valve sleeve; and
   a pin slidably received through the valve sleeve and engaging at its ends the first and second pistons.

9. A vehicular anti-lock brake system comprising:
   an isolation valve provided in a first supply line between a source of pressurized fluid and a first wheel brake to control fluid pressure at the first wheel brake; and
   a follow valve provided in a second supply line between the source of pressurized fluid and a second wheel brake to exclusively control fluid pressure at the second wheel brake without the use of another valve in response to pressure at the first wheel brake so that pressure in the second wheel brake is substantially similar to pressure in the first wheel brake; and
   a pump having an inlet in fluid communication with the isolation valve and the follow valve for exclusively reducing fluid pressure at the first and second wheel brakes without the use of a valve other than the isolation valve and the follow valve.

10. The brake system defined in claim 9 wherein each of the first and second wheel brakes are associated with front wheels of a vehicle.

11. The brake system defined in claim 9 wherein each of the first and second wheel brakes are associated with rear wheels of a vehicle.

12. The brake system defined in claim 9 wherein the follow valve includes a pair of slidable pistons and a slidable pin.

13. The brake system defined in claim 9 wherein the follow valve includes:
   a first piston slidably received in a valve sleeve,
   a second piston slidably received outside of the valve sleeve; and
   a pin slidably received through the valve sleeve and engaging at its ends the first and second pistons.

* * * * *